US011556845B2

(12) United States Patent
Lu et al.

(10) Patent No.: US 11,556,845 B2
(45) Date of Patent: Jan. 17, 2023

(54) SYSTEM FOR IDENTIFYING DUPLICATE PARTIES USING ENTITY RESOLUTION

(71) Applicant: International Business Machines Corporation, Armonk, NY (US)

(72) Inventors: Lucy Lu, Durham, NC (US); Yi-Hui Ma, Mechanicsburg, PA (US); Shanna Hayes, Cary, NC (US); Weichen Wang, Cary, NC (US); Eliza Salkeld, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 699 days.

(21) Appl. No.: 16/555,647

(22) Filed: Aug. 29, 2019

(65) Prior Publication Data

US 2021/0065046 A1 Mar. 4, 2021

(51) Int. Cl.
*G06F 17/10* (2006.01)
*G06N 20/00* (2019.01)
(Continued)

(52) U.S. Cl.
CPC ........... *G06N 20/00* (2019.01); *G06F 16/901* (2019.01); *G06F 9/451* (2018.02)

(58) Field of Classification Search
CPC ........ G06N 20/00; G06F 16/901; G06F 9/451
See application file for complete search history.

(56) References Cited

U.S. PATENT DOCUMENTS

| 6,523,019 B1 * | 2/2003 | Borthwick | G06N 20/00 706/45 |
| 7,970,766 B1 * | 6/2011 | Shamsi | G06F 16/288 707/803 |

(Continued)

FOREIGN PATENT DOCUMENTS

| CA | 3073217 A1 * | 5/2019 | ......... G06F 16/2246 |
| CN | 104573130 A * | 4/2015 | ........... G06F 16/285 |

(Continued)

OTHER PUBLICATIONS

Non Final Office Action dated Aug. 17, 2021 in related U.S. Appl. No. 16/555,641.

(Continued)

*Primary Examiner* — Shahid K Khan
(74) *Attorney, Agent, or Firm* — Troutman Pepper Hamilton Sanders LLP

(57) ABSTRACT

An entity resolution system performs a method of resolving one or more candidate entities based on a data set. The entity resolution system has a machine learning module and a narrative module. The machine learning module generates a synthesized data set, the synthesized data set comprising similarity ratings for each entity feature. The narrative module applies a clustering analysis to determine one or more distances between the group of similarity ratings for each entity feature and one or more clusters associated with known relationships between entities, generates a narrative output based on one or more distances. The narrative output states at least one identified relationship between at least two entities of the plurality of candidate entities and a confidence score. The narrative engine also provides the narrative output to a user interface.

18 Claims, 10 Drawing Sheets

(51) Int. Cl.
*G06F 16/901* (2019.01)
*G06F 9/451* (2018.01)

(56) References Cited

U.S. PATENT DOCUMENTS

| | | | | |
|---|---|---|---|---|
| 8,190,538 | B2* | 5/2012 | Zhang | G06F 16/90344 |
| | | | | 706/12 |
| 8,712,758 | B2* | 4/2014 | Crouch | G06F 40/279 |
| | | | | 704/9 |
| 9,189,473 | B2* | 11/2015 | Gallé | G06F 40/295 |
| 9,292,797 | B2 | 3/2016 | He et al. | |
| 9,311,301 | B1* | 4/2016 | Balluru | G06N 5/022 |
| 9,672,251 | B1* | 6/2017 | Whang | G06N 5/02 |
| 9,772,992 | B2* | 9/2017 | Cucerzan | G06F 40/295 |
| 2008/0319978 | A1 | 12/2008 | Brun et al. | |
| 2009/0106242 | A1* | 4/2009 | McGrew | G06F 16/219 |
| 2009/0198678 | A1* | 8/2009 | Conrad | G06F 16/215 |
| | | | | 707/999.005 |
| 2011/0029532 | A1* | 2/2011 | Knight | G06F 16/353 |
| | | | | 707/E17.089 |
| 2011/0251984 | A1* | 10/2011 | Nie | G06Q 10/10 |
| | | | | 706/18 |
| 2012/0197862 | A1* | 8/2012 | Woytowitz | G06F 16/36 |
| | | | | 707/E17.109 |
| 2012/0303557 | A1* | 11/2012 | Lu | G06N 20/10 |
| | | | | 706/12 |
| 2013/0325759 | A1* | 12/2013 | Rachevsky | G06V 10/764 |
| | | | | 706/12 |
| 2014/0136184 | A1 | 5/2014 | Hatsek et al. | |
| 2014/0279739 | A1* | 9/2014 | Elkington | G06N 20/00 |
| | | | | 706/12 |
| 2015/0324454 | A1* | 11/2015 | Roberts | G06F 16/3349 |
| | | | | 707/734 |
| 2016/0012124 | A1* | 1/2016 | Ruvini | G06Q 30/0201 |
| | | | | 707/760 |
| 2016/0048770 | A1* | 2/2016 | Thomas | G06F 17/16 |
| | | | | 707/706 |
| 2016/0357790 | A1* | 12/2016 | Elkington | G06F 16/215 |
| 2017/0011091 | A1* | 1/2017 | Chehreghani | G06F 16/2455 |
| 2018/0082183 | A1 | 3/2018 | Hertz et al. | |
| 2019/0213273 | A1* | 7/2019 | Vasudevan | G06K 9/6254 |
| 2019/0311229 | A1 | 10/2019 | Qian et al. | |
| 2019/0354574 | A1* | 11/2019 | Wick | G06F 40/216 |
| 2019/0361961 | A1* | 11/2019 | Zambre | G06F 16/2365 |
| 2019/0370696 | A1* | 12/2019 | Ezen Can | G06N 20/00 |
| 2020/0272845 | A1 | 8/2020 | He et al. | |
| 2020/0387529 | A1* | 12/2020 | Jagadish | G06N 20/00 |

FOREIGN PATENT DOCUMENTS

| | | | | |
|---|---|---|---|---|
| CN | 110134965 A | * | 8/2019 | G06F 17/2705 |
| EP | 2664997 A2 | * | 11/2013 | G06F 17/278 |
| WO | WO-0122285 A2 | * | 3/2001 | G06F 16/215 |

OTHER PUBLICATIONS

Heckel, Reinhard, et al. "Approximate Ranking from Pairwise Comparisons." ArXiv:1801.01253 [Cs, Math, Stat], Jan. 2018. arXiv.org, http://arxiv.org/abs/1801.01253. (Year: 2018).

Aug. 29, 2019, U.S. Appl. No. 16/555,647, 20210065046.

Aug. 29, 2019, U.S. Appl. No. 16/555,641, 20210064705.

Kobayashi, Fumiko, Aziz Eram, and John Talburt. "Entity resolution using logistic regression as an extension to the rule-based oyster system." 2018 IEEE Conference on Multimedia Information Processing and Retrieval (MI PR). IEEE, 2018. (Year: 2018).

Mudgal, Sidharth, et al. "Deep learning for entity matching: A design space exploration " Proceedings of the 2018 International Conference on Management of Data. 2018. (Year: 2018).

Ebaid, Amr, et al. "Explainer: entity resolution explanations." 2019 IEEE 35th International Conference on Data Engineering (ICDE). IEEE, Apr. 2019. (Year: 2019).

* cited by examiner

SYSTEM FOR IDENTIFYING DUPLICATE PARTIES USING ENTITY RESOLUTION

TECHNICAL FIELD

The present application relates generally to identifying duplicate parties and, more particularly, to systems and methods for identifying duplicate parties using entity resolution.

BACKGROUND

There are many ways to describe a person, place, or thing. However, how do we know if two descriptions are describing the same thing, if nothing else is known? Two different entities may have the same name, while the same entity may go by alternative names. Data may be incorrect or incomplete in one location, but not in another. This concept is relevant to financial institution data. In one example, when a customer tries to open an account at a bank, the bank's due diligence step should determine if this customer already has an account, is on a screening list, or is someone with high risk (e.g., by determining that the customer is the same as a customer with an account), even if the information given is different than information already stored.

When banks evaluate their customer's risk internally, assigning a risk score to every account would be less accurate than assigning a risk score to every customer, using information from, for example, multiple accounts. An obstacle to attaining this goal is the ability or inability of the institution to always know that a customer is the same entity as another known entity (or different), and thus, whether they have multiple accounts. Further, an ability to link money launderer's accounts would expose suspicious transaction patterns. For example, it would be suspicious if money wired out ends up being wired into their own (different) account.

The present disclosure describes embodiments that relate to the issue of resolving whether two entities are the same or different, given multiple sets of information in order to address the issues described above, as well as other related objectives in the art.

SUMMARY

According to some embodiments, the present disclosure describes a computer-implemented method for performing entity resolution. The method includes receiving a data set with a first entity having first entity features and a second entity having second entity features, applying a machine learning algorithm to generate a synthesized data set, the synthesized data set comprising similarity ratings for each entity feature, applying a clustering analysis to determine one or more distances between the group of similarity ratings for each entity feature and one or more clusters associated with known relationships between entities, and generating a narrative output based on one or more distances. The narrative output states at least one identified relationship between at least two entities of the plurality of candidate entities and a confidence score. The method also includes providing the narrative output to a user interface.

According to other embodiments, the present disclosure describes an entity resolution system including a processing device and a memory comprising instructions which are executed by the processing device for performing entity resolution on a data set received by the entity resolution, the data set comprising a plurality of candidate entities and associated entity features. The entity resolution system includes a machine learning module and a narrative module. The machine learning module generates a synthesized data set, the synthesized data set comprising similarity ratings for each entity feature. The narrative module applies a clustering analysis to determine one or more distances between the group of similarity ratings for each entity feature and one or more clusters associated with known relationships between entities, generates a narrative output based on one or more distances. The narrative output states at least one identified relationship between at least two entities of the plurality of candidate entities and a confidence score. The narrative engine also provides the narrative output to a user interface.

Additional features and advantages of this disclosure will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

Figure 1:
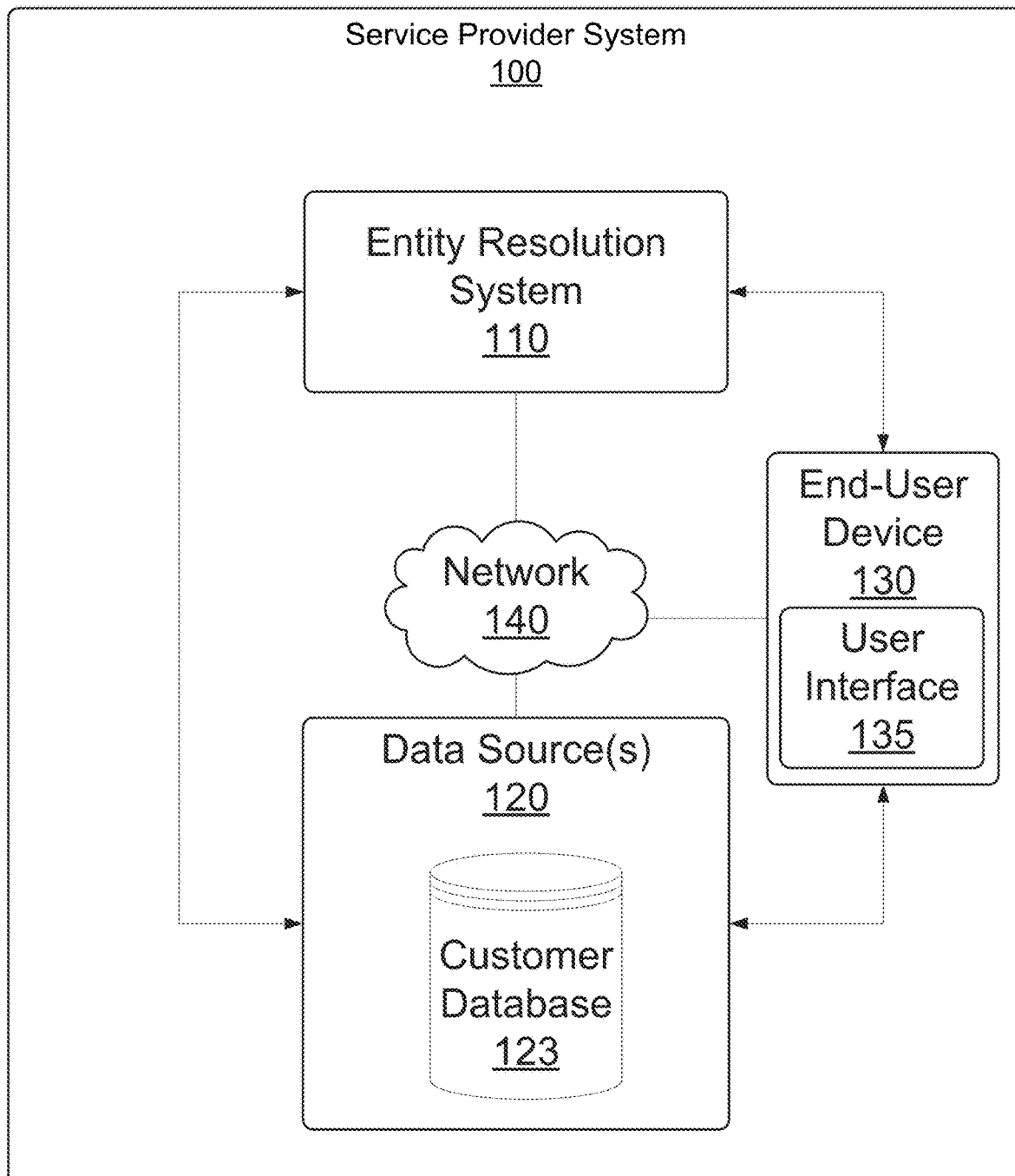
FIG. 1 depicts a block diagram of an exemplary service provider system, consistent with disclosed embodiments.

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the example provided herein without departing from the spirit and scope of the present disclosure.

Embodiments of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN) and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java™, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present disclosure relates to an entity resolution system for determining whether two entities are related in some way (e.g., same person, family members, same residence, etc.) or the entities are two unrelated people. An entity may take the form of a list of known characteristics of an individual, such as the information received by a bank in relation to the opening of an account and stored as data. This information may include, for example, name, address, social security number, date of birth, signature, etc. In another example, an entity may be an identifying data list associated with a known bad-actor, such as individuals on tracking or watch list for fraudulent activity.

Disclosed embodiments include a system for performing a process regarding the identity of individuals when comparing different sets of information regarding those individuals. The disclosed embodiments include a multi-layered system for processing data using at least two channels: a narrative channel and an evaluation channel. The narrative channel is part of an output process in which an entity resolution decision may be rendered. For example, given two sets of data, the entity resolution system may provide textual output regarding the likelihood and reasoning that the sets of data represent the same individual (or, if the sets of data represent different people, provide a likely relationship between the two). The evaluation channel is part of a feedback process in which the narrative channel is evaluated and improved. Together, the narrative channel and evaluation channel provide a comprehensive, self-improving approach to entity resolution.

FIG. 1 is an illustration of an exemplary service provider system 100. The service provider system 100 may include an entity resolution system 110, one or more data sources 120, and an end-user device 130. A network 140 may connect the entity resolution system 110, the one or more data sources 120, and/or the end-user device 130.

The entity resolution system 110 may be a computing device, such as a back-end server. The entity resolution system 110 may include components that enable data analysis functions and practical applications thereof, such as entity resolution of a data set including features of multiple entities (even if the "multiple" entities are actually the same entity). The entity resolution system 110 may include one or more interconnected computing devices having processing and/or storage elements.

The one or more data sources 120 may be computing devices and/or storage devices configured to supply data to the entity resolution system 110. In one example, the one or more data sources 120 comprise a customer database 123, which may be populated with customer information, such as identifying information associated with a customer profile.

The end-user device 130 may be a computing device (e.g., a desktop or laptop computer, mobile device, etc.). The end-user device 130 may communicate with the entity resolution system 110 to receive information and provide feedback related to an entity resolution process. In some embodiments, the end-user device 130 may include a user interface 135 enabling a user to view information such as results of an entity resolution process.

The network 140 may be a local or global network and may include wired and/or wireless components and functionality which enable internal and/or external communication for components of the service provider system 100. The network 140 may be embodied by the Internet, provided at least in part via cloud services, and/or may include one or more communication devices or systems which enable data transfer to and from the systems and components of the service provider system 100.

In accordance with some exemplary embodiments, the entity resolution system 110, data source(s) 120, end-user device 130, or the related components include logic implemented in specialized hardware, software executed on hardware, or any combination of specialized hardware and software executed on hardware, for implementing the service provider system 100 or related components. In some exemplary embodiments, the entity resolution system 110 or any of its components may be or include the IBM Watson system available from International Business Machines Corporation of Armonk, N.Y., which is augmented with the mechanisms of the illustrative embodiments described hereafter.

Figure 2:
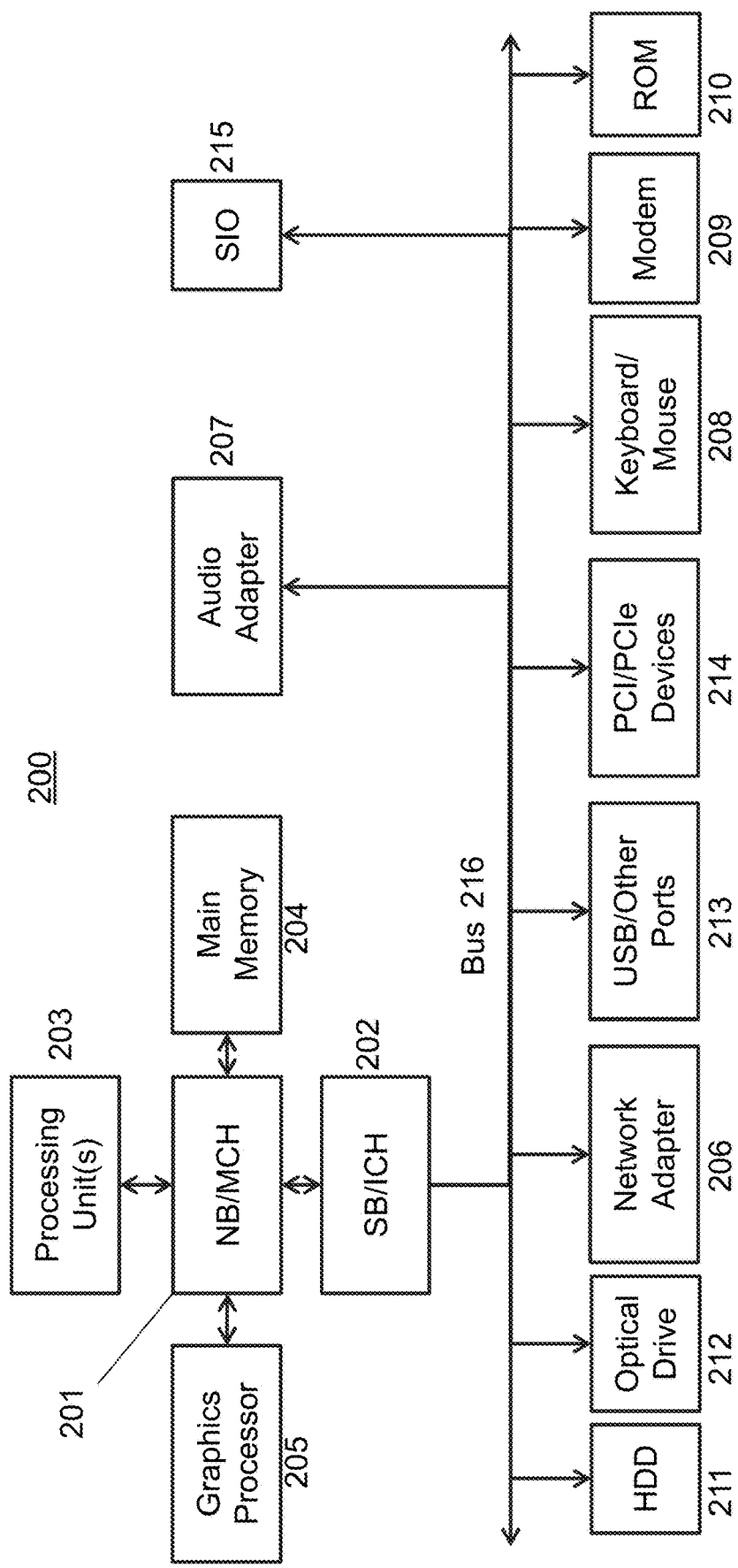
FIG. 2 is a block diagram of an example data processing system in which aspects of the illustrative embodiments are implemented.

FIG. 2 is a block diagram of an example data processing system 200 in which aspects of the illustrative embodiments are implemented. Data processing system 200 is an example of a computer in which computer usable code or instructions implementing the process for illustrative embodiments of the present invention are located. In one embodiment, FIG. 2 represents the entity resolution system 110, which implements at least some of the aspects of the service provider system 100 described herein.

In the depicted example, data processing system 200 can employ a hub architecture including a north bridge and memory controller hub (NB/MCH) 201 and south bridge and input/output (I/O) controller hub (SB/ICH) 202. Processing unit 203, main memory 204, and graphics processor 205 can be connected to the NB/MCH 201. Graphics processor 205 can be connected to the NB/MCH 201 through an accelerated graphics port (AGP).

In the depicted example, the network adapter 206 connects to the SB/ICH 202. The audio adapter 207, keyboard and mouse adapter 208, modem 209, read only memory (ROM) 210, hard disk drive (HDD) 211, optical drive (CD or DVD) 212, universal serial bus (USB) ports and other communication ports 213, and the PCI/PCIe devices 214 can connect to the SB/ICH 202 through bus system 216. PCI/PCIe devices 214 may include Ethernet adapters, add-in cards, and PC cards for notebook computers. ROM 210 may be, for example, a flash basic input/output system (BIOS). The HDD 211 and optical drive 212 can use an integrated drive electronics (IDE) or serial advanced technology attachment (SATA) interface. The super I/O (SIO) device 215 can be connected to the SB/ICH 202.

An operating system can run on processing unit 203. The operating system can coordinate and provide control of various components within the data processing system 200. As a client, the operating system can be a commercially available operating system. An object-oriented programming system, such as the Java™ programming system, may run in conjunction with the operating system and provide calls to the operating system from the object-oriented programs or applications executing on the data processing system 200. As a server, the data processing system 200 can be an IBM® eServer™ System p® running the Advanced Interactive Executive operating system or the LINUX® operating system. The data processing system 200 can be a symmetric multiprocessor (SMP) system that can include a plurality of processors in the processing unit 203. Alternatively, a single processor system may be employed.

Instructions for the operating system, the object-oriented programming system, and applications or programs are located on storage devices, such as the HDD 211, and are loaded into the main memory 204 for execution by the processing unit 203. The processes for embodiments of the website navigation system can be performed by the processing unit 203 using computer usable program code, which can be located in a memory such as, for example, main memory 204, ROM 210, or in one or more peripheral devices.

A bus system 216 can be comprised of one or more busses. The bus system 216 can be implemented using any type of communication fabric or architecture that can provide for a transfer of data between different components or devices attached to the fabric or architecture. A communication unit such as the modem 209 or network adapter 206 can include one or more devices that can be used to transmit and receive data.

Those of ordinary skill in the art will appreciate that the hardware depicted in FIG. 2 may vary depending on the implementation. For example, the data processing system 200 includes several components which would not be directly included in some embodiments of the entity resolution system 110. However, it should be understood that an entity resolution system 110 may include one or more of the components and configurations of the data processing system 200 for performing processing methods and steps in accordance with the disclosed embodiments.

Other internal hardware or peripheral devices, such as flash memory, equivalent non-volatile memory, or optical disk drives may be used in addition to or in place of the hardware depicted. Moreover, the data processing system 200 can take the form of any of a number of different data processing systems, including but not limited to, client computing devices, server computing devices, tablet computers, laptop computers, telephone or other communication devices, personal digital assistants, and the like. Essentially, data processing system 200 can be any known or later developed data processing system without architectural limitation.

Figure 3:
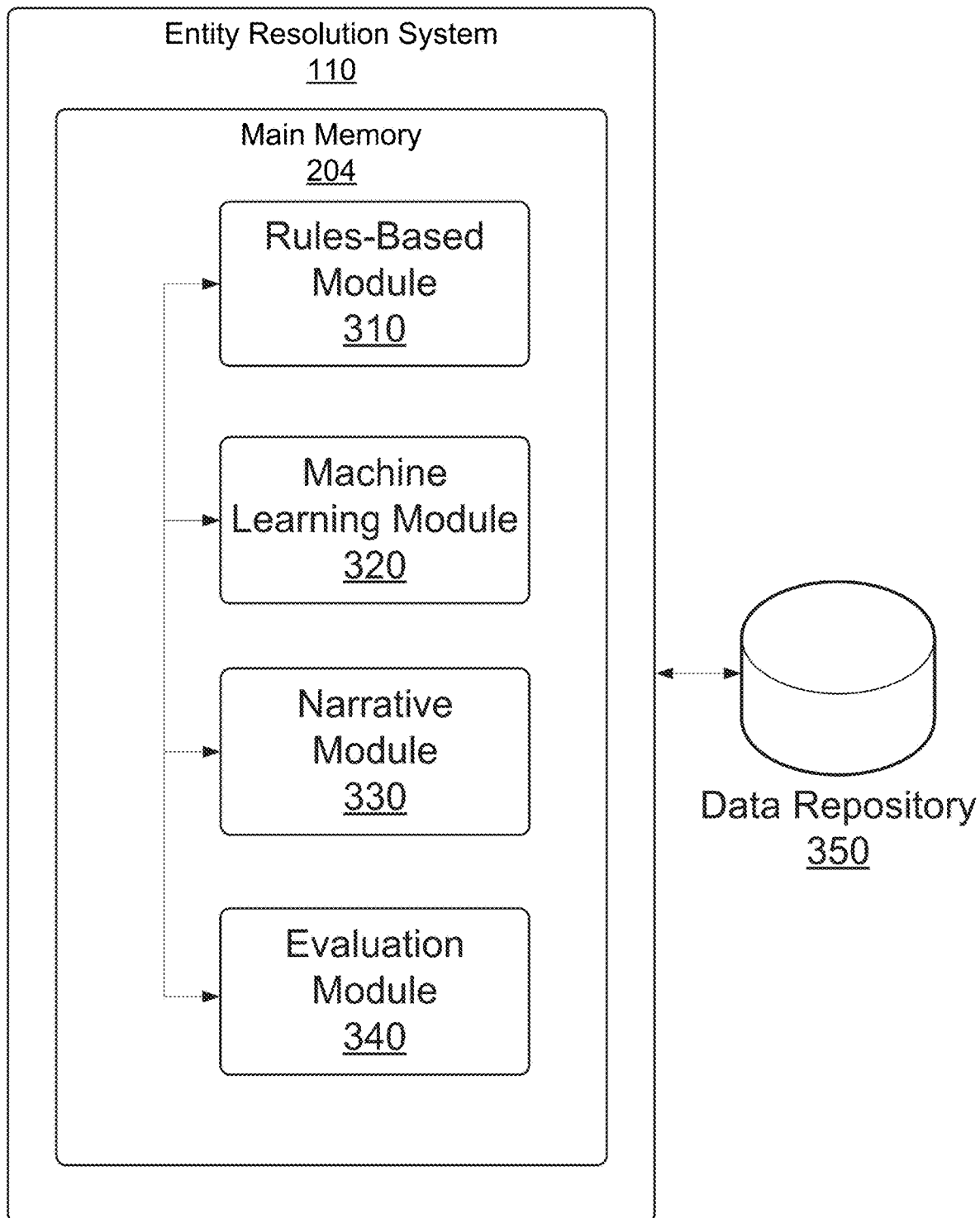
FIG. 3 is a block diagram of an exemplary entity resolution system, consistent with disclosed embodiments.

FIG. 3 illustrates an exemplary embodiment of the entity resolution system 110. In an exemplary embodiment, the entity resolution system 110 include a rules-based module 310, a machine learning module 320, a narrative module 330, and an evaluation module 340. These subsystems of the entity resolution system 110 may be components of a single device, or may be separated devices connected to each other (e.g., via the network 140). The rules-based module 310, machine learning module 320, narrative module 330, and evaluation module 340 may be implemented in hardware and/or software. In some embodiments, the entity resolution system 110 may further include and/or be connected to one or more data repositories 350.

The rules-based module 310 may be configured to apply one or more rules to a received data set to determine whether candidate entities are the same. In some embodiments, the rules-based module 310 may alternatively or additionally prepare the data set for other components of the entity resolution system 110. For example, the rules-based module 310 may receive data associated with an entity and create a data matrix including one or more characteristics. For example, the rules-based module 310 may filter and sort data such that it is useable as input for the machine learning module 320.

In another example, the rules-based module 310 may function as a screening layer. The rule-based module 310 may be configured to provide high-efficiency by using clearly defined, definite patterns and rules. For example, the rules-based module 310 may determine that two data sets represent the same person because they have the same name and social security number. In another example, the rules-based module 310 may determine that two data sets represent different people because they have no features in common.

The machine learning module 320 may be configured to apply one or more AI algorithms to a data set to determine the relationship between two or more candidate entities present in the data set. The machine learning module 320 may be configured to utilize mathematical, statistical, and/or probabilistic models and/or machine learning algorithms to generate pairings with or without probabilities to identify the relationship between two or more candidate entities. In one example, the machine learning module 320 may be configured to determine a relationship between two features, such as two first names, two last names, two social security numbers, etc. The machine learning module 320 may assign a value (e.g., between 0 and 1) to describe a similarity between two features.

The narrative module 330 may be configured to operate in conjunction with the rules-based module 310 and/or machine learning module 320 to convert a result from either or both modules into a narrative explanation. The narrative explanation may be generated based on output from one or more components of the entity resolution system 110, such as any of the modules 310-340. For example, the narrative module 330 may perform a clustering operation to match data points in a parallel matrix to a narrative explanation. Data can be compared to known cluster information to determine a likelihood that the data set belongs in a cluster and assign a narrative explanation accordingly.

The evaluation module 340 is configured to perform a feedback operation to adjust the rules-based module 310, the machine learning module 320, and/or the narrative module 330. The evaluation module 340 is configured to use results and elements of an entity resolution process to determine evaluation metrics that assess the quality of the entity resolution system 110. The evaluation module 340 is configured to perform a monitoring process to track performance of the rule-based module, machine learning module, and narrative module. In some embodiments, the evaluation engine may also obtain user feedback (e.g., feedback from user interface 135). In one example, the evaluation module 340 may provide feedback to improve a machine learning process for rating a similarity of two features.

Figure 4:
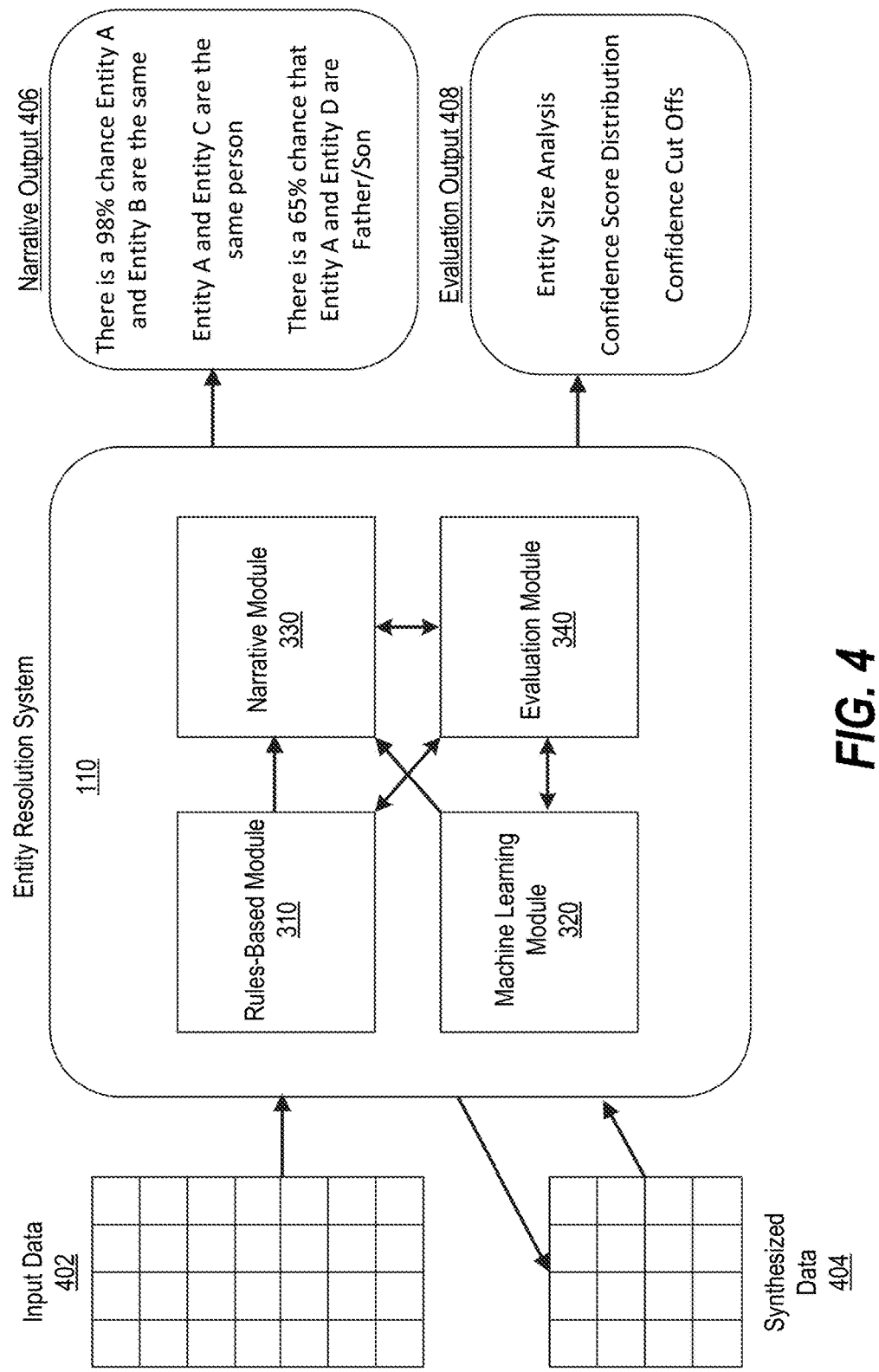
FIG. 4 is an example visual flow through an entity resolution system, consistent with disclosed embodiments.

FIG. 4 is an example logical flow 400 through the entity resolution system 110. A data set is provided to and received by the entity resolution system 110. The data set, in some embodiments, includes one or more of an input dataset 402 and a synthesized dataset 404. The input data 402 set includes data related to two or more "candidate" entities. The synthesized dataset 404 may be additional data that is generated based on the input data 402 for performing entity resolution. In other embodiments, the synthesized data set is used for validation. In exemplary embodiments, there are two flows through the entity resolution system 110, a narrative flow and an evaluation flow.

The data sets 402, 404 are passed through the entity resolution system 110 in order to produce a narrative output 406 and an evaluation output 408. The rules-based module 310 utilizes rules to make decisions as to whether two parties are the same entity. In one example, the rules including definitions for known relationships. A relationship between a first entity and a second entity may be determined if the first entity features and the second entity features match one or more definitions.

For example, if a candidate entity "A" and candidate entity "B" have the same Social Security Number, they may be determined to be the same entity, with a probability of 1, based on a programmed rule. In some embodiments, the rules-based module 310 may identify customer records based on matching rules (e.g., find all records with a matching data feature such as name, address, SSN, etc.). The customer records may be considered candidate entities and be used for comparison purposes (e.g., further entity resolution).

The machine learning module 320 may use a variety of techniques such as regularized logistic regression, or hierarchical clustering to match candidate entities with varying levels of confidence. For example, candidate "B" and candidate "C" may be determined to be the same entity, with a probability of 0.98, as per the results of regularized logistic regression performed by the machine learning module 320.

The narrative module 330 may receive results of the rules-based module 310 and machine learning module 320 and produce a narrative output 406, such as a textual output similar to the examples of FIG. 4. In one example, the narrative module 330 may state that entity A and entity B are definitively the same person, based on an exact match by a rule in the rules-based module 310. In another example, the machine learning module 320 may produce a pairing of entities with a probability associated therewith for the relationship between them (e.g., there is a 75% chance that entity A and entity B are the same person).

In some embodiments, the narrative module 330 of may use a distance calculation to determine how results (which may be in the form of a synthesized data set 404) compare to known information by determining which "group" the data is nearest (e.g., in an nth dimensional space), where each "group" is a narrative or information for a narrative. For example, the narrative module 330 may include an analytical model that determines the probability that a given data set is in a known group. The narrative module 330 may produce one or more textual messages based on these probabilities. The narrative module 330 may further connect multiple results from comparison of a plurality of candidate entities and may also include an explanation of the result (e.g., which module produced the probability). For example, the narrative output 406 may include a statement that the rules-based module 310 connected entities A and B, and the machine learning module 320 connected parties B and C, and, as such, entities A, B, and C resolve to the same entity. Thus, the narrative output 406 provides a nontechnical audience the ability to interpret and understand why the entity resolution system 110 matched different parties.

Figure 5:
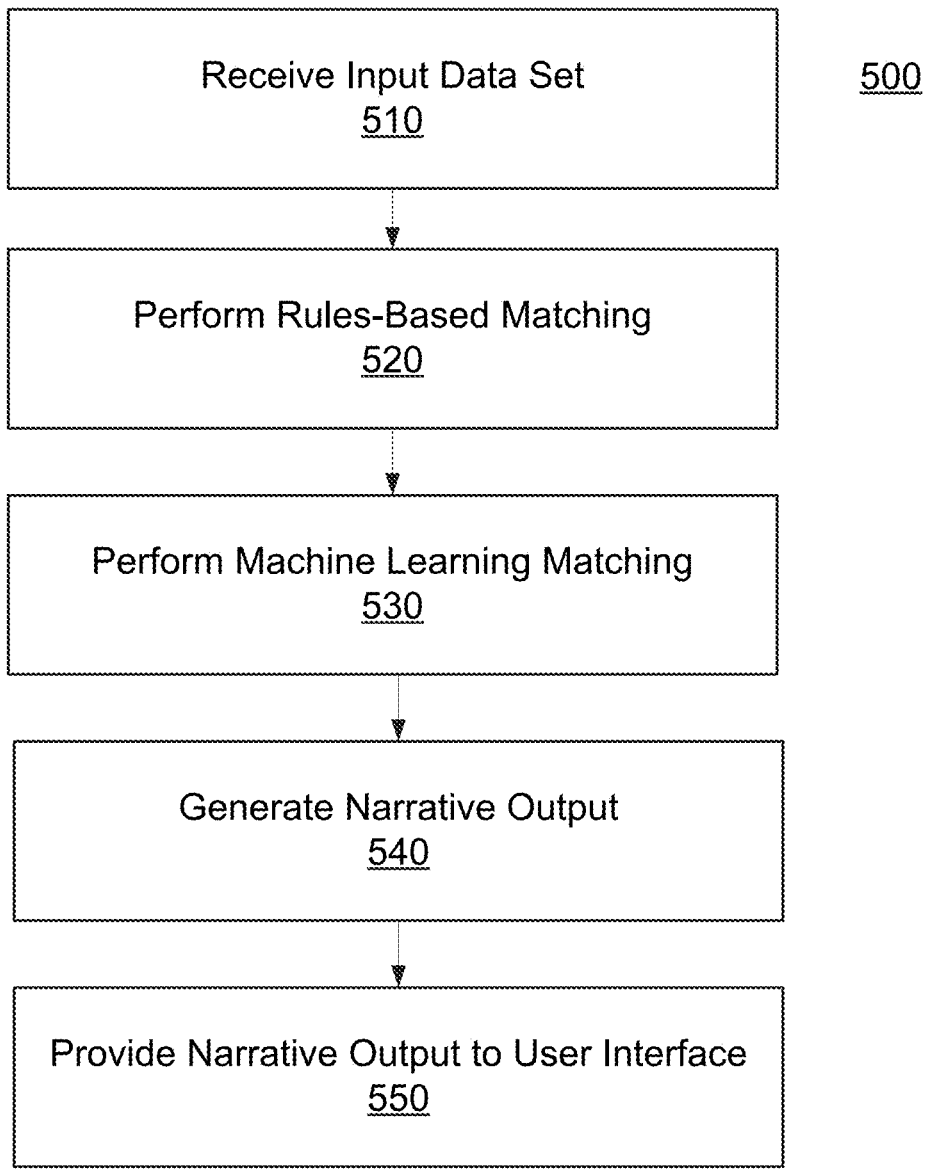
FIG. 5 is a flowchart of an exemplary process using an entity resolution system to produce narrative output, consistent with disclosed embodiments.

FIG. 5 is a flowchart of an exemplary process 500 for performing entity resolution. The entity resolution system 110 may perform one or more steps of the process 500 in order to use information from data source(s) 120 (e.g., customer data) to determine a relationship between two or more candidate entities. In one example, the entity resolution system 110 may use an unknown entity (e.g., an entity associated with an individual opening an account) and attempt to find records associated with entities that are potential matches to the unknown entity (e.g., from a customer database 123). In another example, the entity resolution system 110 may receive a list of candidate entities to compare (e.g., candidate entities A-Z).

In step 510, the entity resolution system 110 receives an input data set. The input data set may include a first entity having first entity features and a second entity having second entity features. The entity features may include, for example, known and unknown characteristics of the entity such as name, address, social security number, etc.

In step 520, the entity resolution system 110 performs rules-based matching. For example, the rules-based module 310 may use one or more rules to determine whether the first and second entity are the same (or other relationship). In one example, if the first entity features and the second entity features include the same social security number and name, it may be determined that the first and second entities are the same entity (relationship=self/same person). In another example, the rules-based module 310 may identify candidate entities that may include one or more matching entity features as the first entity found in the input data set. In another example, the rules-based module 310 may screen out known relationships (e.g., candidate entities with same name except for Sr. and Jr. suffix are determined to be different people with a relationship of parent/child).

In step 530, the entity resolution system 110 may perform machine learning matching on the data sets to determine information about the relationship between the candidate entities. In one example, the machine learning module 320 may produce a pairwise distance matrix based on a comparison of features and a rating of the similarity between the features.

In step 540, the entity resolution system 110 may generate a narrative output. For example, the narrative module 330 may match certain specifications of synthesized data or machine learning results, or match a set of entities to a known cluster to determine a matching narrative for a pair of entities. In step 550, the entity resolution system 110 may provide narrative output to the user interface 135 module.

Figure 6:
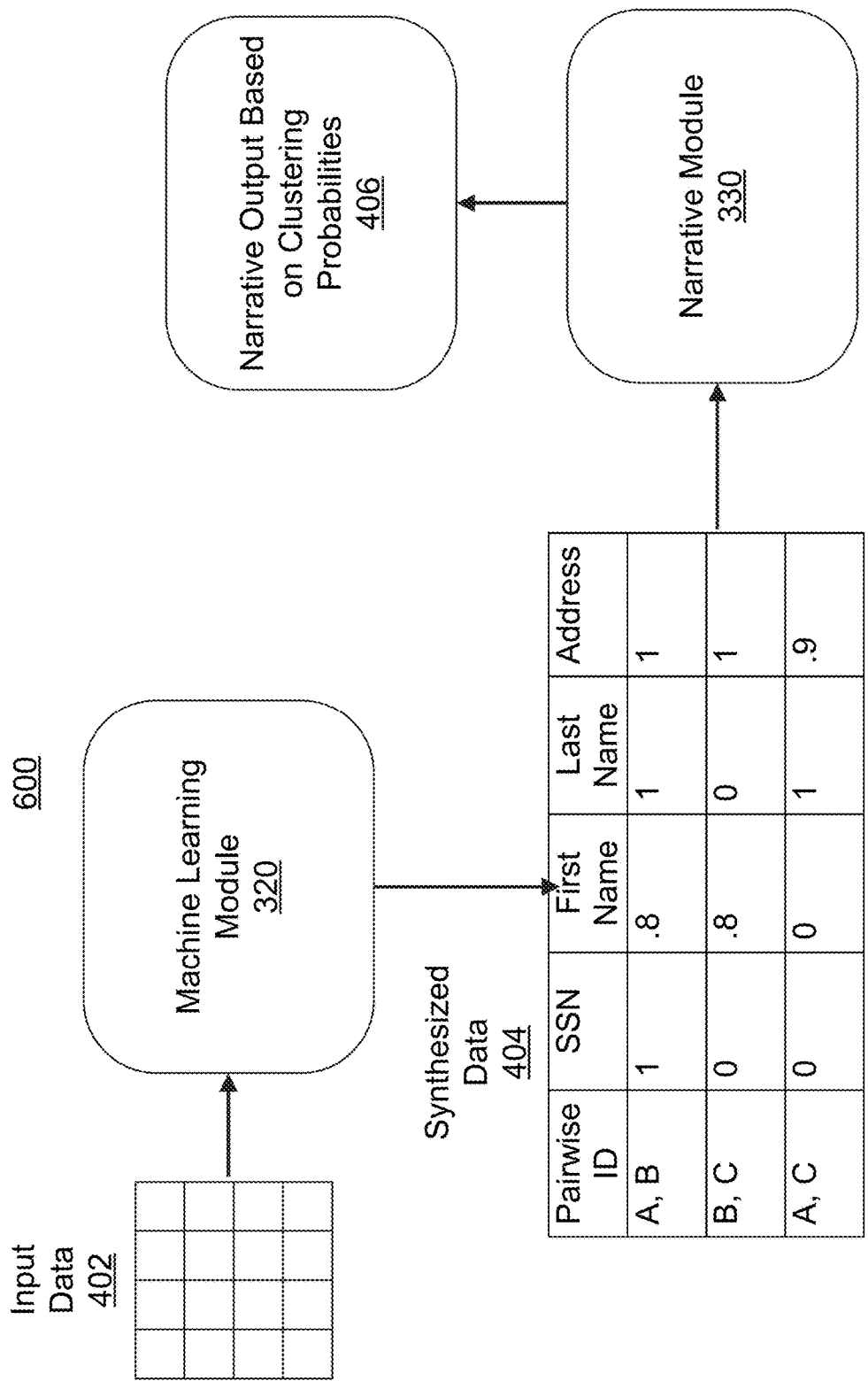
FIG. 6 is an example of a visual flow of a clustering process for determining a narrative output based on a pairwise distance matrix.

FIG. 6 is a visual flow 600 of an exemplary embodiment of the process 500 for using a distance matrix to compare multiple candidate entities (e.g., A, B, and C) to each other to determine a relationship therebetween. As shown, the input data 402 is provided to the machine learning module 320 of the entity resolution system 110. The machine learning module 320 produces a pairwise distance matrix which is a synthesized data set 404. The synthesized data set 404 in this embodiment includes a comparison between features and associated similarity rating. For instance, a comparison of candidate entities A and B may include a rating of "1" for the similarity of the social security number data. This may indicate that the data sets include the same social security number feature. In another example, candidate entities B and C have a social security number rating of 0 and an address rating 1. The machine learning module 320 may be configured to use trained models to identify the similarity ratings based on supervised learning, unsupervised learning, regression analysis, etc. A group of similarity ratings (e.g., each of the similarity ratings between two candidate entities) may be collectively considered a relationship marker. The relationship marker may exist in nth dimensional space, where n=the number of similarity ratings.

The synthesized data 404 with the pairwise distance matrix may be provided to the narrative module 330. The narrative module 330 may use a grouping of ratings (e.g., one row of the matrix) to determine how close the ratings are to known narratives. For example, the narrative module 330 may include a comparison model that compares the data points to clusters of data points that represent known relationships. The narrative module 330 may produce a probability that a given data set in the synthesized data 404 is within a known cluster. For instance, the narrative module 330 may determine that the distance data points for candidate entities A, B is in a cluster for "same person/self" with 98% confidence. This determination may be based on a calculation that the data set is very close to the cluster associated with "same person/self" that is known in nth dimensional space. As a result, the narrative module 330 may produce narrative output 406 that states "There is a 98% chance that entities A and B are the same person."

In another example, the narrative module 330 may determine that candidate entities A and C may have a probability split between different known relationship clusters. For instance, synthesized data 404 indicates that entities A and C have the same last name (1 rating) and similar address, but different social security numbers and first names). The narrative module 330 may determine that entities A and C have a 45% chance of being different people—related as spouses, a 35% chance of being different people—related as parent/child, and a 20% chance of being different people—related as siblings. The entity resolution system 110 may produce narrative output 406 that conveys this information in a textual format.

Figure 7:
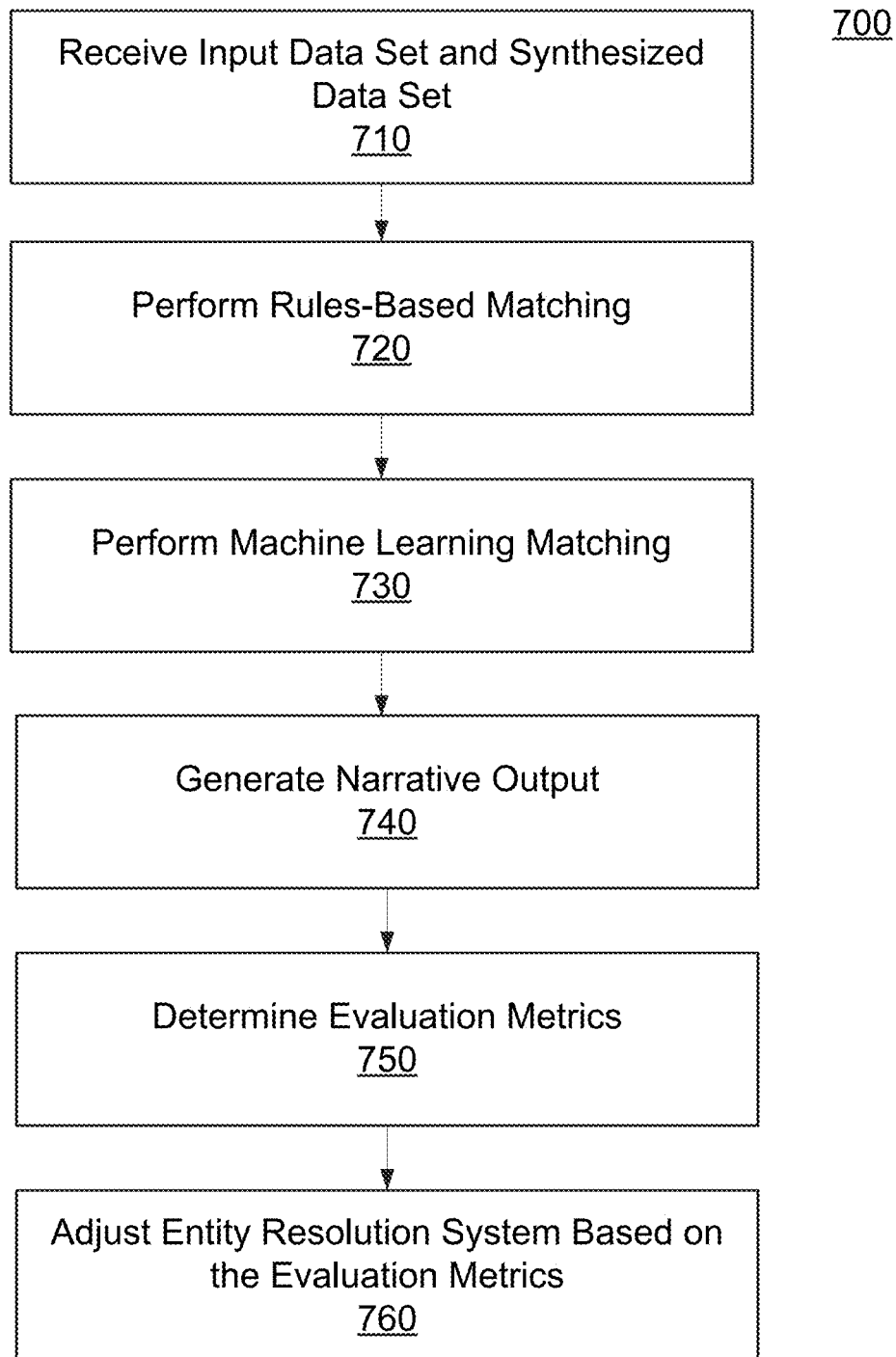
FIG. 7 is a flowchart of an exemplary process for evaluating and adjusting an entity resolution system, consistent with disclosed embodiments.

FIG. 7 is a flowchart of an exemplary process 700 for adjusting the entity resolution system 110 based on evaluation output. The entity resolution system 110 may perform one or more steps of the process 700 in order to use feedback and known information to adjust the modules of the entity resolution system 110 to more accurately and efficiently produce narrative and other output regarding the matching of candidate entities.

In step 710, the entity resolution system 110 may receive an input data set and a synthesized data set. For example, the entity resolution system 110 may receive a candidate entity as the input data set and a plurality of records with known matching criteria as the synthesized data set. The synthesized data set may be provided by a user to test and improve the entity resolution system 110.

In step 720, the entity resolution system 110 may perform rules-based matching of the input data set and the synthesized data set. For example, the rules-based module 310 may use programmed rules to determine if any entity features match such that two entities can be cleared as being the same. In step 730, the entity resolution system 110 may perform machine learning matching to further determine relationships in the input data set and/or synthesized data set. In step 740, the entity resolution system 110 may produce a narrative output, which may be a textual output indicating a probability of one or more relationships between candidate entities in the input data set and/or the synthesized data set. The steps 710-740 may be similar to the steps 510-540 in the process 500 for testing purposes of input data and/or synthesized data with known answers.

Figure 8:
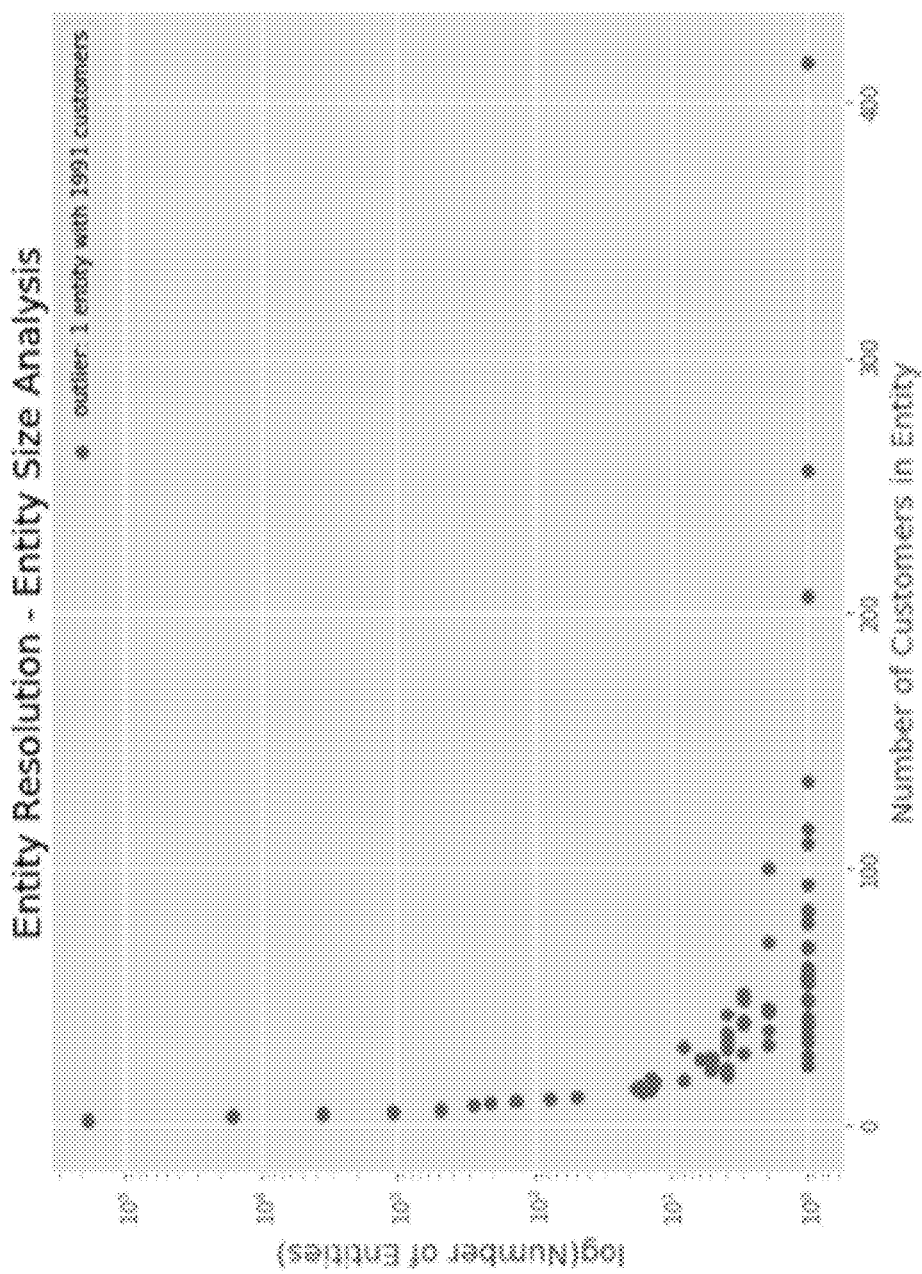
FIG. 8 is a graph of an exemplary evaluation metric, consistent with disclosed embodiments.
Figure 9:
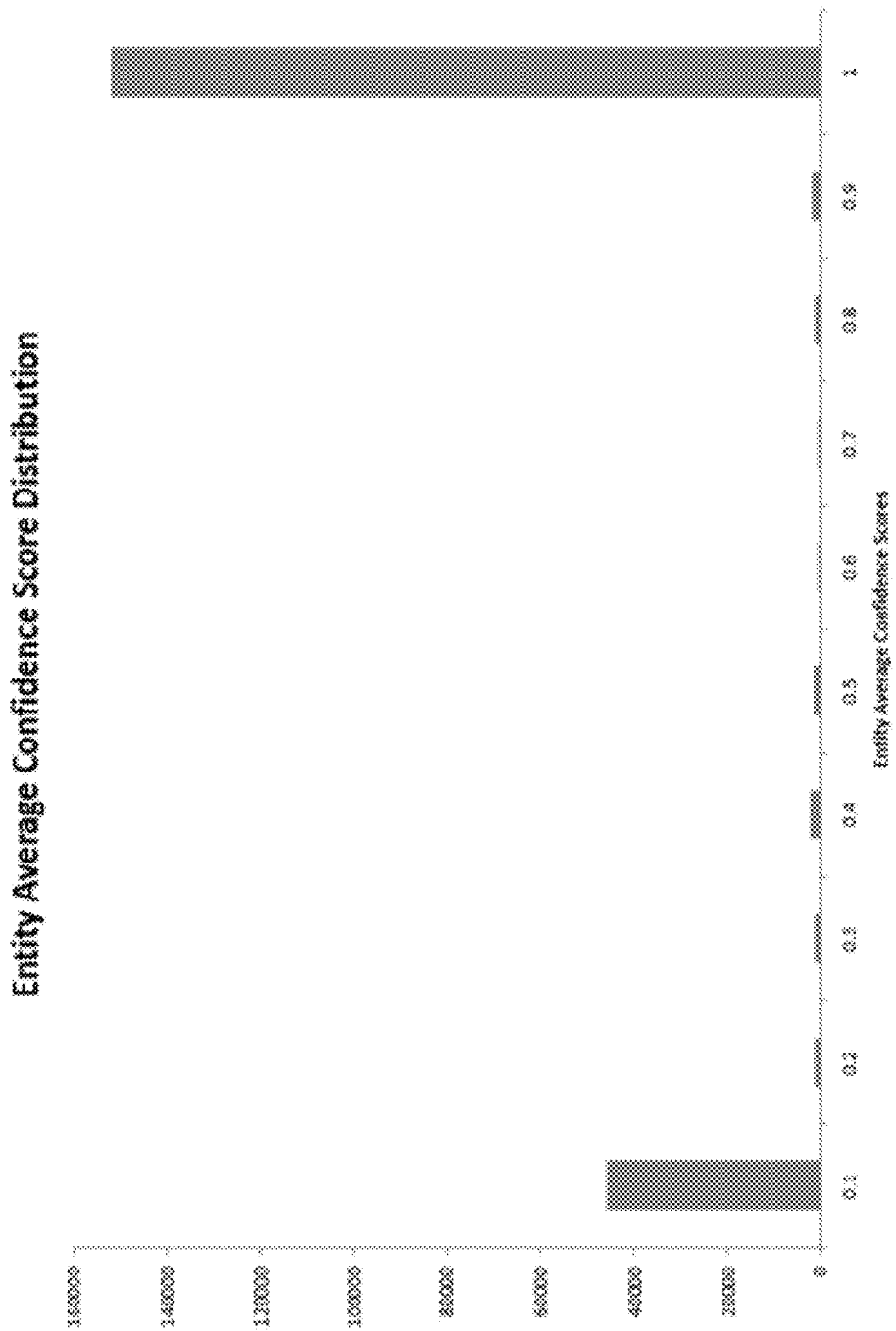
FIG. 9 is a graph of another exemplary evaluation metric, consistent with disclosed embodiments.
Figure 10:
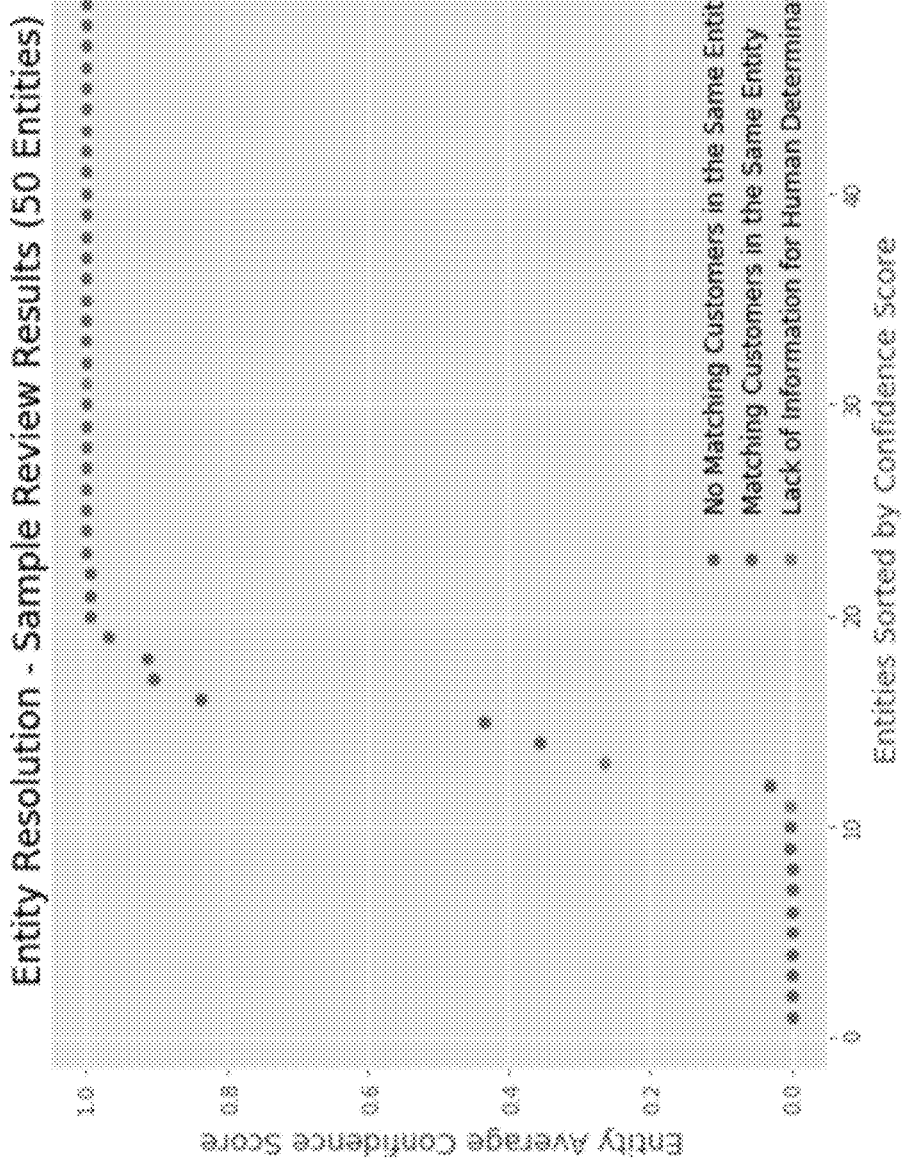
FIG. 10 is a graph of yet another exemplary evaluation metric, consistent with disclosed embodiments.

In step 750, the entity resolution system 110 may determine evaluation metrics based on the results of the rules-based matching, the machine learning matching, and/or the narrative output determination. The evaluation metrics may include, for example, an entity size analysis, a confidence score distribution, and confidence cut-offs. The evaluation module 340 may determine these metrics, and, in some embodiments, provide an evaluation score to the user interface 135. FIGS. 8-10 provide examples of graphical representations of metrics, including a graph 800 of an entity size analysis, a graph 900 of a confidence score distribution, and a graph 1000 of a confidence score cut-off analysis. These metrics provide insight into the performance of the entity resolution system 110.

In step 760, the entity resolution system 110 may adjust the entity resolution system 110 based on the evaluation metrics. For example, rules of the rules-based module 310 can be modified, added, or removed. In another example, the machine learning module 320 and/or models of the narrative engine 330 may be configured, replaced, retrained, etc. based on the metrics.

In one example, the metrics may indicate that a rule in the rules-based module 310 produces incorrect results associated with high confidence scores. A user can then retrain or remodel the rule in order to improve its accuracy.

In some embodiments, the entity resolution system 110 may use a confidence score distributions and cut-offs to adjust machine learning models associated with determining relationships between entity features. For example, the evaluation module 340 may adjust weighting factors for determine similarity ratings for features when comparing data to produce a pairwise distance matrix.

In other embodiments, the input data and synthesized data may be used to train a clustering analysis performed by the narrative engine 330. For instance, the synthesized data may include known information (e.g., known relationship) with pairwise distance matrices to create clusters associated with those known relationships. These clusters may be used in process 500 to generate a narrative output based on the probability that new input data is in one of these clusters. Moreover, metrics associated with input data (e.g., confidence score analysis) may be used to adjust the clusters in the narrative module 330.

The disclosed embodiments provide an efficient and comprehensive approach to providing a determination regarding the relationship between candidate entities in a group. The disclosed entity resolution system provides multiple layers of analysis and/or varying techniques for comparing data sets and providing useful and practical output in the form of a narrative explanation of a result. The disclosed embodiments further provide an evaluation and feedback mechanism to test the entity resolution system, obtain feedback, and adjust the associated models and features.

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the example provided herein without departing from the spirit and scope of the present invention.

The system and processes of the Figures are not exclusive. Other systems, processes and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers, and processes can be implemented using hardware components, software components, and/or combinations thereof. No claim element herein is to be construed under the provisions of 35 U.S.C. 112, sixth paragraph, unless the element is expressly recited using the phrase "means for."

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A computer-implemented method for performing entity resolution in a data processing system comprising a processing device and a memory comprising instructions which are executed by the processing device, the method comprising:
   receiving a data set comprising first entity features describing a first entity and second entity features describing a second entity;
   generating a synthesized data set from the first entity features and the second entity features, the synthesized data set comprising similarity ratings for each entity feature of the first and second entity features, the similarity ratings between the first entity and the second entity collectively being a relationship marker;
   determining one or more distances by performing a clustering analysis on the similarity ratings, the one or more distances being measured from the relationship marker to one or more clusters associated with known relationships between entities;
   generating a narrative output based on the one or more distances, the narrative output comprising:
      at least one identified relationship between the first entity and the second entity, and
      a confidence score;
   providing the narrative output to a user interface; and
   determining one or more metrics based on known information to evaluate the narrative output and adjusting at least one of a machine learning algorithm or the clustering analysis based on the one or more metrics.

2. The method of claim 1, wherein the synthesized data set is a pairwise distance matrix comprising the similarity ratings.

3. The method of claim 2, wherein the confidence score is a measure of how close the relationship marker is to a given cluster associated with a known relationship between entities.

4. The method of claim 1, wherein the confidence score is a probability that the relationship marker belongs in a given cluster associated with a known relationship between entities.

5. The method of claim 4, wherein the at least one identified relationship comprises at least two identified relationships and the confidence scores are probabilities that each identified relationship is correct.

6. The method of claim 1, wherein the first entity features and second entity features comprise at least social security number, first name, last name, and address.

7. The method of claim 1, wherein the at least one identified relationship comprises same person and different person as options.

8. The method of claim 1, wherein the at least one identified relationship comprises a relationship identifier for identifying a relationship when the first entity and the second entity are different people, the relationship identifier comprising at least spouses, parent/child, siblings, and unrelated/same household as options.

9. The method of claim 1, wherein adjusting at least one of the machine learning algorithm or the clustering analysis comprises adjusting weighting factors used in determining the similarity ratings or the distances.

10. An entity resolution system comprising a processing device and a memory comprising instructions which are executed by the processing device for performing entity resolution on a data set received by the entity resolution, the data set comprising a plurality of candidate entities and associated entity features, the entity resolution system further comprising:
    a machine learning module configured to generate a synthesized data set, the synthesized data set comprising similarity ratings for each entity feature in the data set, the similarity ratings between two entities of the plurality of candidate entities collectively being a relationship marker associated with those two entities;
    a narrative module configured to:
       determine one or more distances by performing a clustering analysis on the similarity ratings, the one or more distances being measured from each relationship marker to one or more clusters associated with known relationships between entities;
       generate a narrative output based on the one or more distances, the narrative output comprising:
          at least one identified relationship between a first entity and a second entity, and
          a confidence score; and
       provide the narrative output to a user interface; and
    an evaluation engine configured to determine one or more metrics based on known information to evaluate the narrative output and adjust at least one of a machine learning module or the narrative module based on the one or more metrics.

11. The entity resolution system of claim 10, wherein the synthesized data set is a pairwise distance matrix comprising the similarity ratings.

12. The entity resolution system of claim 11, wherein the confidence score is a measure of how close the relationship marker is to a given cluster associated with a known relationship between entities.

13. The entity resolution system of claim 10, wherein the confidence score is a probability that the relationship marker belongs in a given cluster associated with a known relationship between entities.

14. The entity resolution system of claim 13, wherein the at least one identified relationship comprises at least two identified relationships and the confidence scores are probabilities that each identified relationship is correct.

15. The entity resolution system of claim 10, wherein adjusting at least one of the machine learning module or the narrative module comprises adjusting weighting factors used in determining the similarity ratings or the distances.

16. The entity resolution system of claim 10, further comprising a rules-based module configured to select entities from the plurality of candidate entities for providing to the machine learning module.

17. The entity resolution system of claim 16, wherein the rules-based module is configured to select the entities based on records of entities that include matches to an unknown entity.

18. A tangible, non-transitory computer program product configured to perform an entity resolution process, comprising:

receiving a data set comprising first entity features describing a first entity and second entity features describing a second entity;

generating a synthesized data set from the first entity features and the second entity features, the synthesized data set comprising similarity ratings for each entity feature of the first and second entity features, the similarity ratings between the first entity and the second entity collectively being a relationship marker;

determine one or more distances by performing a clustering analysis on the similarity ratings, the one or more distances being measured from the relationship marker to one or more clusters associated with known relationships between entities;

generating a narrative output based on the one or more distances, the narrative output comprising:
  at least one identified relationship between the first entity and the second entity, and
  a confidence score;

providing the narrative output to a user interface; and determining one or more metrics based on known information to evaluate the narrative output and adjusting at least one of a machine learning algorithm or the clustering analysis based on the one or more metrics.

* * * * *